United States Patent [19]
Pan et al.

[11] Patent Number: 6,075,596
[45] Date of Patent: Jun. 13, 2000

[54] LOW COST FIBER OPTIC CIRCULATOR

[75] Inventors: Jing-Jong Pan, Milpitas; Feng Que Zhou, San Jose, both of Calif.

[73] Assignee: E-Tek Dynamics, Inc., San Jose, Calif.

[21] Appl. No.: 09/081,261

[22] Filed: May 19, 1998

[51] Int. Cl.[7] .................................................. G01B 9/02
[52] U.S. Cl. ........................................... 356/345; 356/351
[58] Field of Search ..................................... 356/345, 351; 385/12, 14, 11; 359/484

[56] References Cited

U.S. PATENT DOCUMENTS

| | | |
|---|---|---|
| 3,720,457 | 3/1973 | Swartz et al. . |
| 4,272,159 | 6/1981 | Matsumoto . |
| 4,464,022 | 8/1984 | Emkey . |
| 4,650,289 | 3/1987 | Kuwahara . |
| 4,988,170 | 1/1991 | Buhrer . |
| 4,991,938 | 2/1991 | Buhrer et al. . |
| 5,204,771 | 4/1993 | Koga . |
| 5,212,586 | 5/1993 | Van Delden . |
| 5,319,483 | 6/1994 | Krasinski et al. . |
| 5,471,340 | 11/1995 | Cheng et al. . |
| 5,689,593 | 11/1997 | Pan et al. . |

FOREIGN PATENT DOCUMENTS

| | | |
|---|---|---|
| 2947730 | 7/1980 | Germany . |

OTHER PUBLICATIONS

Cheng et al., "Novel Configuration of an Erbium–Doped Fiber Amplifier Using an Optical Circulator", *OFC '92*, p.69 (1992).

Delavaux et al., "Circulator Based Amplifier for Bi–Directional Optical Transmission in Star Networks", pp. 53–56 (no journal name or date).

Emkey, "A Polarization–Independent Optical Circulator for 1.3 μm", *IEEE J. Lightwave Technol.*, LT–1(3):466–469 (1983).

Fujii, "High–Isolation Polarization–Independent Quasi–Optical Circulator", *IEEE J. Lightwave Technol.*, 10(9):1226–9 (1992).

Fujii, "Compact High–Isolation Polarization–Independent Optical Circulator", *Opt. Lett.*, 18(3):250–252 (1993).

Huang et al., "Packaged Double–Pass Travelling–Wave Semiconductor Laser Amplifiers", *Electron. Lett.*, 27(7):571–572 (1991).

Koga et al., "Polarisation–Insensitive High–Isolation Nonreciprocal Device for Optical Circulator Application", *Electron. Lett.*, 27(11):903–905 (1991).

Koga et al., "High–Isolation Polarization–Insensitive Optical Circulator for Advanced Optical Communication Systems", *IEEE J. Lightwave Technol.*, 10(9):1210–1217 (1992).

Matsumoto et al., "Polarization–Independent Optical Circulator: An Experiment", *Appl. Opt.*, 19(1):108–112 (1980).

Shibukawa et al., "Compact Optical Circulator for Near–Infrared Region", *Electron. Lett.*, 14(25):816–817 (1978).

Shibukawa et al., "Compact Optical Circulator for Optical Fiber Transmission", *Appl. Opt.*, 18(21):3700–3 (1979).

Shintaku et al., "Waveguide Polarization–Independent Optical Circulator Using a Mach–Zehnder Interferometer", *ECOC 97*, Conference Publication No. 448:57–60 (Sep. 22–25, 1997).

Shirasaki et al., "Compact Polarization–Independent Optical Circulator", *Appl. Opt.*, 20(15):2683–7 (1981).

Zizzo, "Optical Circulator for Fiber–Optic Transceivers", *Appl. Opt.*, 26(16):3470–3 (1987).

*Primary Examiner*—Samuel A. Turner
*Attorney, Agent, or Firm*—Townsend Townsend & Crew LLP; Mark D. Barrish, Esq.

[57] ABSTRACT

Improved optical devices, systems, and methods for selectively directing optical signals generally based on a Mach-Zehnder interferometer. Through accurate control of the phase relationship, the Mach-Zehnder interferometer allows optical signals to either be cumulatively combined so as to enhance the transmitted signal strength, or destructively combined so as to effectively prevent transmission from an optical signal port. This phase relationship can be controlled using a nonreciprocal device having a pair of retarder plates disposed along one of the two legs of the Mach-Zehnder interferometer so as to provide an optical isolator or circulator.

26 Claims, 5 Drawing Sheets

LOW COST FIBER OPTIC CIRCULATOR

BACKGROUND OF THE INVENTION

The present invention relates to optical devices and systems, and in a particular embodiment, provides a Mach-Zehnder interferometer based device which may be used as an optical circulator or isolator.

An optical isolator is a nonreciprocal device which allows the passage of light in only one direction. A signal transmitted in a forward direction through a first port of an optical isolator will be passed to a second optical port. However, optical signals traveling in a rearward direction through the second optical port are blocked by the optical isolator from reaching the first port. Such optical isolators have found a wide variety of uses in optical systems, particularly those using optical fibers.

An optical circulator is a nonreciprocal optical device related to the optical isolator. Optical circulators allow the passage of light from a first port to a second port, as in an optical isolator. However, rather than simply blocking signals traveling in a reverse direction into the second port, such signals are instead transmitted to a third port. Any two consecutive ports of an optical circulator are, in effect, an optical isolator since signals travel in only one direction between the ports.

Circulators will generally have three or more ports. Light transmitted into the first or second port of a three port circulator will be directed to the next higher number port. In a closed circulator, light transmitted into the third (or other highest number port) is passed to the first port. In an open three port circulator, light directed into the third port will be blocked by the circulator without transmitting the light to any other active port. Regardless, the function performed by the circulator is called a circulating operation.

Several types of optical circulators have been developed. The structure of a conventional optical circulator includes three basic components: polarization beam splitters (PBSs), nonreciprocal Faraday rotators, and half-wave plates. Each beam splitter typically includes at least one optical deflection element such as a prism. Assembly of these conventional circulators is fairly difficult, so that the cost of conventional circulators is quite high.

Much work has gone into improving the performance of optical circulators. While conventional circulators provide an isolation of about 30 dB, additional birefringent crystals may be employed to improve isolation to over 40 db. Exemplary bifrefringent enhanced optical circulators are commercially available from E-Tek Dynamics, Inc. of San Jose, Calif., and related devices may also be available from Nippon Telegraph and Telephone Corporation of Japan, FDK America, Inc., of California, and other sources. Generally, circulators which include both a conventional polarization beam splitter and birefringent crystals will have costs higher than those of a conventional circulator.

Optical circulators based on light path deflection of birefringent polarizers have also been proposed and implemented. These birefringent polarizer based structures have enhanced isolation performance, but often at a substantially higher cost. Moreover, optical circulators based on either polarization beam splitters or birefringent polarizers are susceptible to polarization mode dispersion (PMD) if there is a lack of symmetry between the optical paths of the separated beams. Such polarization mode dispersion can limit the signal transmission speed of an optical network, while the symmetrical circulator structures proposed to date are often very difficult to align and/or include highly specialized optical elements. Once again, exemplary birefringent polarizer based optical circulators are commercially available from E-Tek Dynamics, while competing structures may be available from Nippon Telegraph and Telephone Corporation of Japan, JDS Fitel, Inc., of Canada, Photonic Technologies of Australia, and others.

The incremental improvements in high performance circulators have provided a variety of options for applications requiring high isolation with low insertion loss. Unfortunately, the cost of each circulator structure is often prohibitive for applications requiring numerous circulators. Moreover, there are applications for the optical circulating operation which do not require the performance of these costly structures. For example, in fiber optic networks, relatively low cost amplification is available to overcome a relatively large amount of insertion loss.

A recent paper published by T. Shintaku et al. of NTT Opto-electronics Laboratories of Japan, describes a waveguide polarization-independent optical circulator based on a Mach-Zehnder interferometer. This structure combines two 45° Faraday rotators and two half-wave plates with a Mach-Zehnder interferometer structure. A Faraday rotator and a half-wave plate are aligned symmetrically along each leg of the interferometer, and the resulting circulator is described as providing an isolation of between 14.1 and 23.7 dB with an insertion loss of between 3.0 and 3.3 dB.

While the recently proposed Mach-Zehnder interferometer based optical circulator appears to provide a useful alternative to circulators based on conventional polarization beam splitters, birefringent crystal enhanced polarization beam splitters, and birefringent crystal polarizers, particularly when the cost of these structures is not justified. Nonetheless, it would be desirable to provide still further improvements in optical circulators, and in optical circulation methods. It would be particularly desirable to provide optical circulator structures having improved manufacturability and still lower cost, while maintaining acceptable isolation, insertion loss, polarization mode dispersion, and polarization dependent loss characteristics. It would further be desirable if these improvements were applicable to fiber based optical circulators, integrated optical element systems, table top optical networks, optical isolators, and the like.

SUMMARY OF THE INVENTION

The present invention provides improved optical devices, systems, and methods for selectively transmitting optical signals. The optical devices of the present invention are generally based on a Mach-Zehnder interferometer. Through accurate control of the phase relationship, the Mach-Zehnder interferometer allows optical signals to either be constructively combined (so as to enhance the transmitted signal strength), or destructively combined (so as to reduce or prevent transmission). Surprisingly, this beneficial phase relationship can be combined with a simple asymmetrical nonreciprocal structure positioned along one of the two legs of the Mach-Zehnder interferometer. Generally, two retarder plates will be positioned along one leg, while a light sensitive fiber disposed along the other leg can allow the optical path length to be adjusted so as to avoid polarization mode dispersion. As aligning retarder plates relative to each other is significantly easier than independently aligning each retarder plate within the surrounding Mach-Zehnder structure, the present invention provides significant fabrication advantages over known Mach-Zehnder interferometer based optical circulators.

In a first aspect, the present invention provides an optical device comprising a first optical element in a first optical path of a first optical signal. The first element directs a portion of the first signal along a first optical path leg, and a portion of the first signal along a second optical path leg. A second optical element is optically coupled to the first and second legs. The second element constructively combines the first signal portions to transmit a first signal along a second optical path. The second element also directs a portion of a second optical signal from the second path along the first leg, and a portion of the second signal along the second leg. A Faraday rotator is disposed along the first leg or the second leg. First and second retarder plates are disposed along the first leg. The retarder plates are arranged relative to each other such that the first element destructively combines the second signal portions to diminish transmission of the second signal along the first optical path.

The first and second retarder plates will generally comprise half-wave plates that are affixed together. The optical axes of the half-wave plates will generally be offset by 45°. Conveniently, the Faraday rotator may also be disposed along the first leg adjacent the half-wave plates. In the exemplary embodiment, an optical waveguide having an index of refraction which varies with exposure to radiation (for example, a light sensitive fiber of the type typically used for fabrication of Fiber Bragg Gratings) is included along the second leg to adjustably equalize the first and second leg path lengths.

The first and second optical elements generally separate signals evenly, even where the signals have varying wavelengths. Suitable optical elements include wavelength neutral 50/50 beam splitters, but will more typically comprise 3 dB fiber couplers or 3 dB integrated waveguide couplers. As the retarder plates and Faraday rotator may be disposed along a single leg, the optical device may comprise an integrated optic waveguide along a contiguous substrate in which the second leg extends contiguously along the substrate from the first coupler to the second coupler. Coupling efficiency may be enhanced by including collimating lenses between the couplers and the retarder plates. While conventional collimating lenses (particularly GRIN lenses) may be used, the devices of the present invention will preferably make use of a microlens formed from a roughly quarter-pitch length of a graded index optical fiber.

In another aspect, the present invention provides an optical circulator comprising a first optical signal port for introducing a first optical signal. A first 3 dB coupler is optically coupled to the first port. The first coupler directs a portion of the first signal along a first optical waveguide leg, and a portion of the first signal along a second optical waveguide leg. The first and second legs have optical path lengths that are equal. A second optical signal port is provided for introducing a second optical signal. A second 3 dB coupler is optically coupled to the first leg, the second leg, and the second port. The second coupler directs a portion of a second optical signal from the second port along the first leg, and a portion of the second signal along the second leg. The second coupler cumulatively combines portions of the first signal portion, and transmits a resulting first passed signal to the second port. A third optical signal port is optically coupled to the first coupler. A 90° Faraday rotator is disposed along the first or second leg, while first and second half-wave plates are disposed along the first leg. The half-wave plates are arranged relative to each other such that the second signal portions are interferingly combined by the first coupler to reduce the second signal at the first port. The second signal portions are cumulatively combined by the first coupler to a resulting second passed signal portion at the third port.

In another aspect, the present invention provides a method for fabricating a Mach-Zehnder based optical device. The method comprises affixing a first retarder plate to a second retarder plate. The affixed retarder plates are inserted within a first optical path leg between a first coupler and a second coupler. A second optical path leg also couples the first and second couplers in parallel with the first leg, such that first signal portions transmitted by the first leg and the second leg are cumulatively combined by the second coupler. Similarly, second signal portions transmitted by the first leg and the second leg are interferingly combined by the first coupler.

In a preferred embodiment, a first sheet of retarder material is affixed to a second sheet of retarder material with a predetermined alignment. The affixed sheets are partitioned into a plurality of affixed retarder plates, so that many pairs of plates are aligned simultaneously.

In yet another aspect, the present invention provides a method for fabricating an optical device. The method comprises exposing a radiation sensitive optical waveguide to radiation. The radiation sensitive optical waveguide is disposed along a first optical path leg between a first coupler and a second coupler, the first leg being parallel with a second optical path leg. The first and second legs have first and second optical path lengths, respectively. The exposing step is performed so as to equalize the first and second optical path lengths to produce a desired power split between a pair of optical signal ports optically coupled to the second coupler.

In yet another aspect, the present invention provides an optical device comprising a single mode optical fiber having an end. A graded index fiber has first and second ends with a length of roughly one quarter pitch therebetween. The first end is adjacent to, and coaxially aligned with, the end of the single mode fiber. Advantageously, this compact structure can be used as a collimating/expanding lens, and/or to focus collimate light signals into the single mode fiber.

DETAILED DESCRIPTION OF THE SPECIFIC EMBODIMENTS

Figure 1:
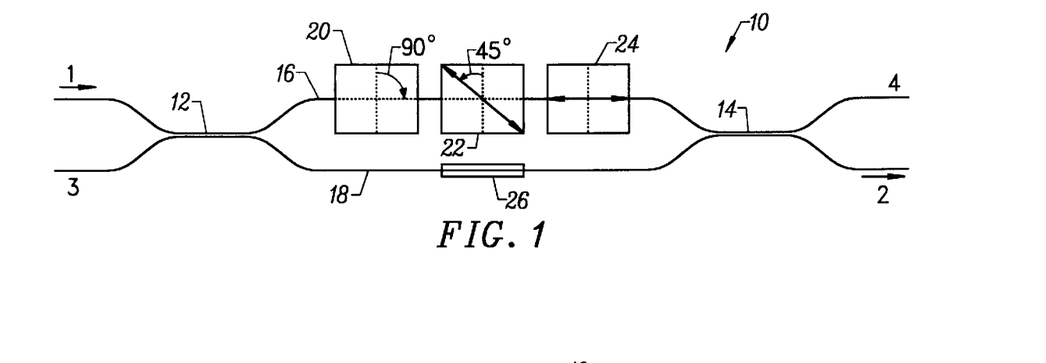
FIG. 1 illustrates an optical circulator according to the principles of the present invention.

Referring now to FIG. 1, a circulator 10 includes first and second couplers 12, 14. A first optical signal path leg 16 and a second optical signal path leg 18 extend in parallel between the couplers 12, 14. Four optical signal ports, here numbered 1, 2, 3, and 4 are available for introducing optical signals into circulator 10, and for transmitting optical signals passed by the circulator. Depending on the structure and arrangement of the circulator, these ports may comprise lengths of optical fiber, optical connections within an integrated optical waveguide, openings for sending and receiving optical signals, and the like.

In the exemplary embodiment, first leg 16 of circulator 10 includes both a 90° Faraday rotator 20, and first and second half-wave plates 22, 24. The function and alignment of these structures will be described in more detail hereinbelow. Second leg 18 of circulator 10 includes a light sensitive fiber 26. This provides a simple and effective mechanism for adjusting an optical path length of second leg 18 relative to first leg 16.

Figure 2:
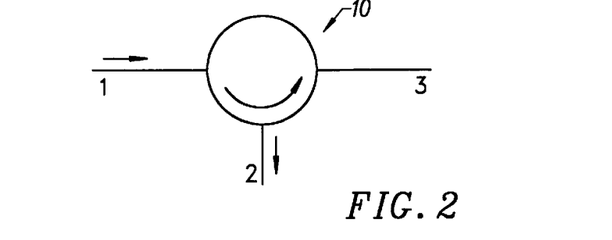
FIG. 2 schematically illustrates the circulation function.

The function of circulator 10 can be understood with reference to FIG. 2. Optical signals which are input into circulator 10 at port 1 will be transmitted to port 2, but will not be passed onto port 3. Signals input into the circulator at port 2 will pass onto port 3, but will not be directed to port 1.

If isolator 10 of FIG. 2 were a closed three port circulator, optical signals input into the circulator at port 3 would then be transmitted to port 1. If, however, circulator 10 comprises an open circulator structure (for example, if port 4 is not connected to an output), optical signals input into port 3 will not be transmitted. The circulators of the present invention may be adaptable to varying numbers of ports, but are particularly well suited for use as open three port circulators, or as closed four port circulators. It is also possible to make use of these structures as an optical isolator, for example, by coupling an input fiber to the first port 1 and an output fiber to second port 2.

Figure 3A:
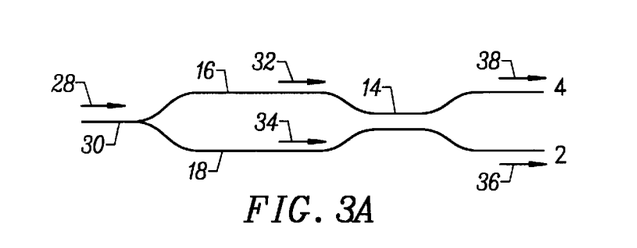
FIGS. 3A and 3B illustrate a Mach-Zehnder interferometer having at least one 3 dB coupler.

As can be understood with reference to FIG. 3A, an optical signal 28 may be separated at a Y-junction 30 so that a first portion of the signal 32 is directed along the first leg 16, and so that an alternate signal portion 34 is directed along second leg 18. Assuming that signal portions 32, 34 have equal power, the amplitudes of the signals output at ports 2 and 4 can be determined by the phase relationship of the signals as they leave legs 16, 18. Where the optical path lengths of the two legs are such that optical signals 32, 34 are constructively combined and directed toward port 2, resulting signal 36 may theoretically have the same power as input signal 28. In this configuration, signal portions 32, 34 will be destructively combined by coupler 14, such that the resulting signal at port 4 may be much less than the strength of input signal 28. In fact, where coupler 14 is a highly accurate 3 dB coupler, and where legs 16, 18 have optical path lengths such that signal portions 32, 34 are combined precisely 180° out of phase, the signal portions may substantially entirely be transmitted to port 2 and substantially isolated from port 4. Similarly, the power split between ports 2 and 4 of the Mach-Zehnder interferometer illustrated in FIG. 3B will depend on the phase relationship of signal portions 32, 34 as combined by second coupler 14.

To provide effective isolation between port 1 and port 4, coupler 12 will split the power of input signal 28 evenly between legs 16, 18. Conveniently, couplers generally split and combine waves with a phase difference of 90°. Because of this, signal portion 34 will also be directed to each of ports 2, 4. Where legs 16, 18 are of equal length, signal portion 34 will be out of phase from signal portion 32 by $\pi/2$ (90°). Similarly, due to second coupler 14, the portion of signal portion 34 which is directed towards port 4 will again be out of phase relative to signal portion 34 by $\pi/2$. Hence, where legs 16, 18 are of equal length, the signal portion transmitted from second leg 18 to port 4 is out of phase by a total of $\pi$ (180°) relative to the portion of the signal which is transmitted across the upper part of the Mach-Zehnder interferometer without transitioning through couplers 12, 14. Where first and second couplers 12, 14 are very precise 3 dB couplers, half of the signal strength from first signal portion 32 will be directed toward each of ports 2, 4. If the power split at each coupler is precisely 50%, and if the signals combined by coupler 14 and directed along port 4 are 180° out of phase, no signal is present at port 4. Ignoring insertion losses, the full strength of the signal will be transmitted to port 4.

In contrast, any part of the signal which is directed towards port 2 has been transferred across coupler 12 or 14 a single time. As a result, the signal portions provided to port 2 from signal portions 32 and 34 will be in phase with each other, and will be cumulatively combined by second coupler 14. This results in transmission of signals from port 1 to port 2, without transmitting the signal to port 4. It should be recognized, however, that the circulators of the present invention will often exhibit insertion losses of about 3 dB or more, due to transmission efficiencies, adjustment errors, manufacturing tolerances, and the like. It should also be noted that the structure illustrated in FIG. 4 is a reciprocal Mach-Zehnder interferometer: signals will pass from port 1 to port 2, and from port 3 to port 4, but will also be transmitted from port 2 to port 1, and from port 4 to port 3.

Figure 3B:
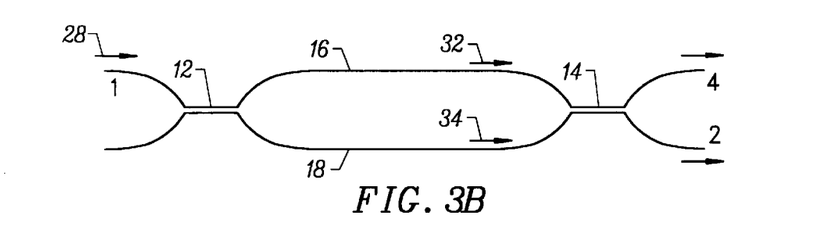
Figure 4:
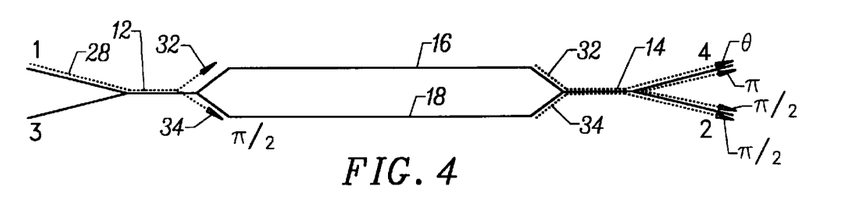
FIG. 4 schematically illustrates how an optical fiber Mach-Zehnder interferometer cumulatively combines optical signal portions in one output port, and interferingly combines optical signals so as to minimize transmission of the signal to another output port.
Figure 5:
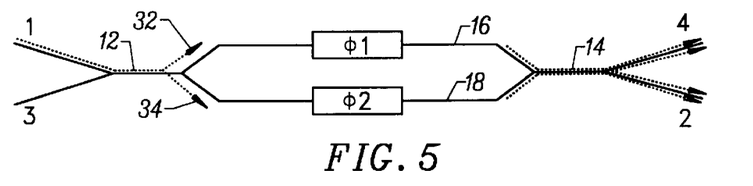
FIG. 5 schematically illustrates a theoretical nonreciprocal structure, as can be used for calculating the desired transformations of the optical signals along the first and second legs of the circulator of FIG. 1.

To modify the Mach-Zehnder interferometers of FIGS. 3B and 4 to provide a nonreciprocal circulating function, we modify our Mach-Zehnder interferometer by introducing a structure into first leg 16 so as to perform first function $\phi 1$ upon signal portion 32. Similarly, we introduce a structure into second leg 18 which performs a second function $\phi 2$ on signal portion 34. We can provide our desired nonreciprocal results by setting:

$$\phi 1 - \phi 2 = 2n\pi, \; n = 0, \pm 1, \pm 2, \ldots$$

for signals travelling from left to right (that is, signals input at ports 1 or 3), and by setting:

$$\phi 1 - \phi 2 = 2m\pi + \pi, \; m = 0, \pm 1, \pm 2, \ldots$$

for signals travelling from right to left (those input at ports 2 or 4), or vice-versa.

One symmetrical arrangement of components which fulfills these equations is described in a paper entitled *Waveguide Polarization-Independent Optical Circulator*

Figure 6:
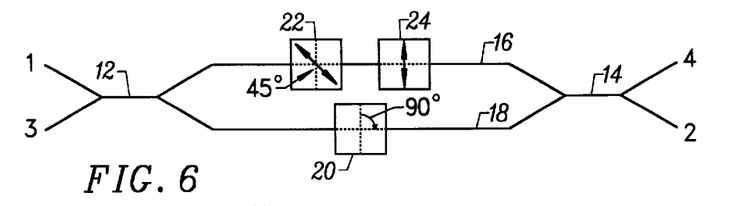
FIG. 6 illustrates an alternative nonreciprocal Mach-Zehnder interferometer structure for use as an optical circulator.
Figure 6A:
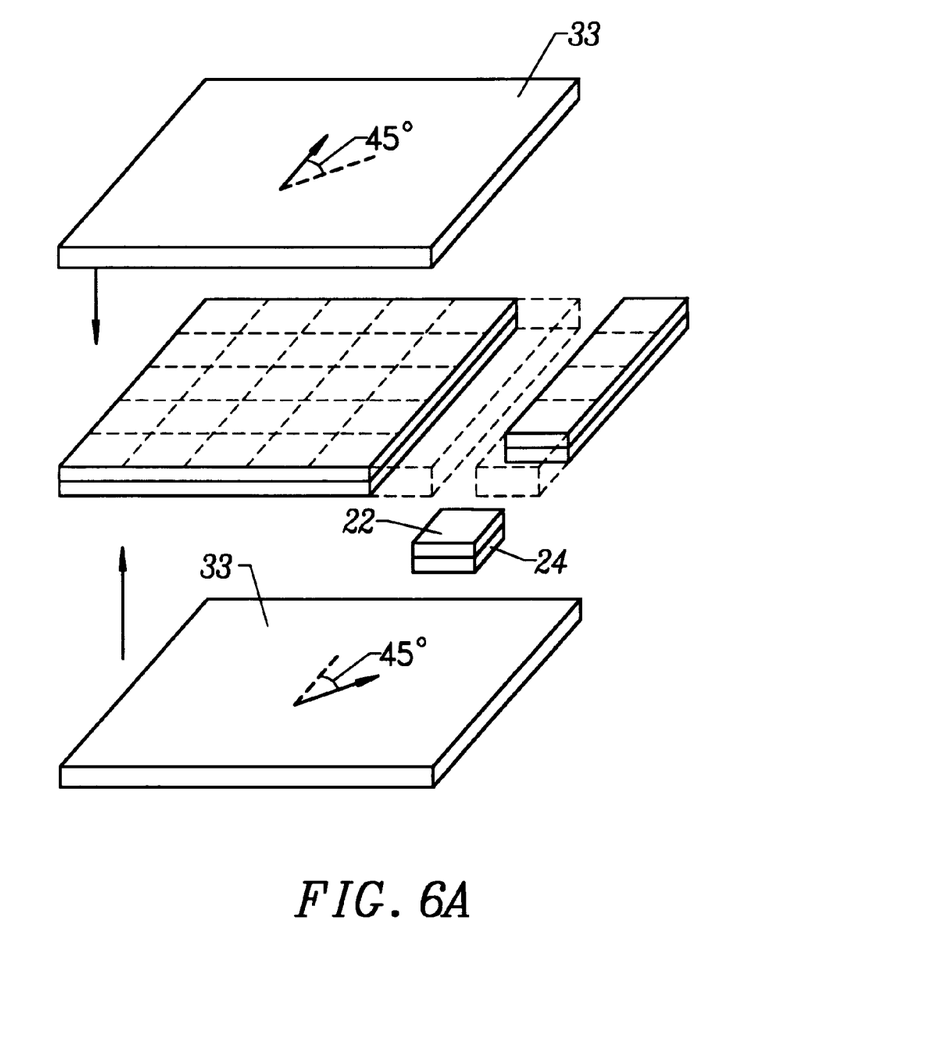
FIG. 6A schematically illustrates a method for pre-aligning a plurality of half-wave plate pairs.

Using A Mach-Zehnder interferometer, T. Shintaku et al. ECOC Publication No. 448, Sep. 22–25, 1997, the full disclosure of which is incorporated herein by reference. This paper describes the use of a half-wave plate and a 45° Faraday rotator symmetrically disposed along each of the first and second legs of a Mach-Zehnder interferometer. To avoid the necessity of accurately aligning the optical axis of the half-wave plates along each leg of the interferometer, the present invention instead includes an asymmetrical non-reciprocal structure comprising first and second half-wave plates 22, 24 positioned along first leg 16, while a 90° Faraday rotator may optionally be disposed along first leg 16 or second leg 18. Positioning both half-wave plates along the same leg significantly enhances the manufacturability of the circulators of the present invention. This is because two large sheets 33 of the half-wave plate material may be accurately aligned relative to each other and bonded together as illustrated in FIG. 6A. These large, bonded sheets may then be partitioned into a large number of accurately aligned and bonded pairs of half-wave plates. These bonded and aligned half-wave plates can then be aligned within the circulator structure illustrated in FIGS. 1 and 6 in a single alignment step. Fabrication and assembly may be even further simplified by first assembling the half-wave plates and the Faraday rotator, and then positioning this sub-assembly along first leg 16, as can be understood with reference to FIGS. 1 and 7A–9.

Figure 7A:
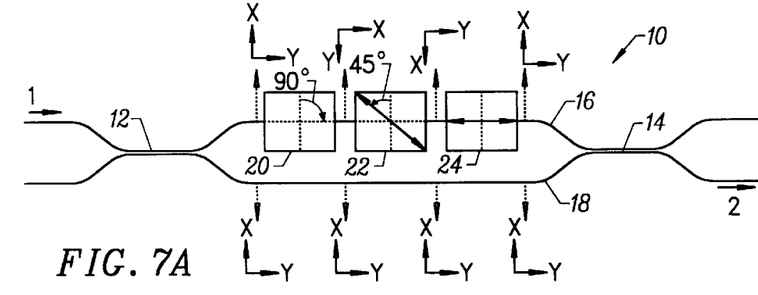
FIGS. 7A and 7B graphically illustrate how the optical components of the circulator of FIG. 1 transform the optical signal as the light signals travel from the left to the right (in FIG. 7A), and from the right to the left (in FIG. 7B).
Figure 7B:
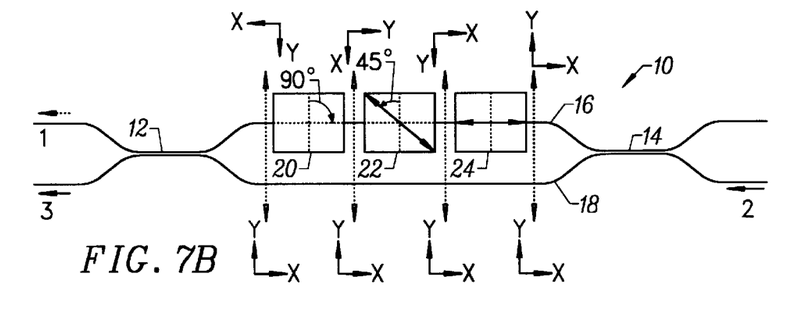

The polarization transformations effected by the half-wave plates and Faraday rotator are illustrated in FIGS. 7A and 7B. It should be understood that the structures imposing transformations Ψ1 and Ψ2 are here assumed to not impose any other changes except the desired phase difference (π or 180°) in one direction. Throughout these transformations, it is assumed that the observer faces the wave vector of the transmitted light. Hence, clockwise angle rotations will be considered counter-clockwise angle rotations when traveling in the reverse direction.

Now reviewing the Jones transformation matrices as a signal moves from left to right along first leg 16 of circulator 10, we find that:

$$\begin{bmatrix} E'_x \\ E'_y \end{bmatrix} = \begin{bmatrix} \cos\frac{\delta_2}{2} + j\cos2\theta_2\sin\frac{\delta_2}{2}, & j\sin2\theta_2\sin\frac{\delta_2}{2} \\ j\sin2\theta_2\sin\frac{\delta_2}{2}, & \cos\frac{\delta_2}{2} - j\cos2\theta_2\sin\frac{\delta_2}{2} \end{bmatrix} \begin{bmatrix} \cos\frac{\delta_1}{2} + j\cos2\theta_1\sin\frac{\delta_1}{2}, & j\sin2\theta_1\sin\frac{\delta_1}{2} \\ j\sin2\theta_1\sin\frac{\delta_1}{2}, & \cos\frac{\delta_1}{2} - j\cos2\theta_1\sin\frac{\delta_1}{2} \end{bmatrix} \begin{bmatrix} \cos\Psi & -\sin\Psi \\ \sin\Psi & \cos\Psi \end{bmatrix} \begin{bmatrix} E_x \\ E_y \end{bmatrix}$$

while the portion of the signal travelling along second leg 18 may be analyzed using the identity matrix:

$$\begin{bmatrix} E'_x \\ E'_y \end{bmatrix} = \begin{bmatrix} 1 & 0 \\ 0 & 1 \end{bmatrix} \begin{bmatrix} E_x \\ E_y \end{bmatrix}$$

in which Ψ designates the rotation angle of Faraday rotator 20 (often 90°), $\theta_1$ designates the orientation angle of the fast axis of the first waveplate 22, $\delta_1$ designates the phase retardation of the first waveplate 22, $\theta_2$ designates the fast axis angle of the second waveplate 24, and $\delta_2$ designates the retardation of the second waveplate 24. $E_x$ and $E_y$ are electric field amplitudes along X and Y axes at the left side of legs 16 and 18, respectively, while $E'_x$ and $E'_y$ correspond to the electric field amplitudes at the right side of legs 16, 18. By inserting our nominal values into the above equations (Ψ=π/2, $\theta_1$=−π/4, $\delta_1$=π, $\theta_2$=0, and $\delta_2$=π) the transformation matrix for first leg 16 for a signal traveling between port 1 and port 2 becomes:

$$\begin{bmatrix} E'_x \\ E'_y \end{bmatrix} = \begin{bmatrix} j & 0 \\ 0 & -j \end{bmatrix} \begin{bmatrix} 0 & -j \\ -j & 0 \end{bmatrix} \begin{bmatrix} 0 & -1 \\ 1 & 0 \end{bmatrix} \begin{bmatrix} E_x \\ E_y \end{bmatrix} = \begin{bmatrix} 1 & 0 \\ 0 & 1 \end{bmatrix} \begin{bmatrix} E_x \\ E_y \end{bmatrix}$$

Using a similar analysis for a signal portion passing from port 2 to port 3 (as illustrated in FIG. 7B) along first leg 16, our Jones matrix is:

$$\begin{bmatrix} E'_x \\ E'_y \end{bmatrix} = \begin{bmatrix} \cos\Psi & \sin\Psi \\ -\sin\Psi & \cos\Psi \end{bmatrix} \begin{bmatrix} \cos\frac{\delta_1}{2} + j\cos2\theta_1\sin\frac{\delta_1}{2}, & j\sin2\theta_1\sin\frac{\delta_1}{2} \\ j\sin2\theta_1\sin\frac{\delta_1}{2}, & \cos\frac{\delta_1}{2} - j\cos2\theta_1\sin\frac{\delta_1}{2} \end{bmatrix} \begin{bmatrix} \cos\frac{\delta_2}{2} + j\cos2\theta_2\sin\frac{\delta_2}{2}, & j\sin2\theta_2\sin\frac{\delta_2}{2} \\ j\sin2\theta_2\sin\frac{\delta_2}{2}, & \cos\frac{\delta_2}{2} - j\cos2\theta_2\sin\frac{\delta_2}{2} \end{bmatrix} \begin{bmatrix} E_x \\ E_y \end{bmatrix}$$

while the signal portion transmitted along second leg 18 is again:

$$\begin{bmatrix} E'_x \\ E'_y \end{bmatrix} = \begin{bmatrix} 1 & 0 \\ 0 & 1 \end{bmatrix} \begin{bmatrix} E_x \\ E_y \end{bmatrix}$$

Per our direction and angle convention, our nominal values are here Ψ=π/2, $\theta_1$=π/4, $\delta_1$=π, $\theta_2$=0, and $\delta_2$=π. These nominal values will result in a first leg transformation matrix as follows:

$$\begin{bmatrix} E'_x \\ E'_y \end{bmatrix} = \begin{bmatrix} 0 & 1 \\ -1 & 0 \end{bmatrix} \begin{bmatrix} 0 & j \\ j & 0 \end{bmatrix} \begin{bmatrix} j & 0 \\ 0 & -j \end{bmatrix} \begin{bmatrix} E_x \\ E_y \end{bmatrix} = \begin{bmatrix} -1 & 0 \\ 0 & -1 \end{bmatrix} \begin{bmatrix} E_x \\ E_y \end{bmatrix}$$

From the above, it can be seen that light propagating from port 1 to port 2 undergoes the same polarization transformation regardless of whether it travels along first leg 16 or second leg 18. In contrast, light propagating from port 2 to port 1 will undergo a reciprocal polarization transformations as it travels along first leg 16 as compared to second leg 18. As a result, the light signal portions directed by first coupler 12 towards port 1 cancel each other out, while the signal portions directed by coupler 12 towards port 3 are cumulatively combined.

To provide broad band performance, optical paths 16, 18 should have optical path lengths that are as close as possible. Optical path length here refers to the index of refraction times the distance the light travels. Assuming the optical path length of first arm 16 is $L_1$ and that the optical path length of second arm 18 is $L_2$, where circulator 10 functions properly for light having a wavelength of $\lambda_1$, we know that $L_1-L_2=k\times\lambda_1$, where k=an integer. To ensure that this circulator will still function properly when the wavelength changes from $\lambda_1$ to $\lambda_1+\Delta\lambda$, then we should have $$\frac{\Delta L}{\lambda 1} - \frac{\Delta L}{\lambda 1 + \Delta\lambda} << \frac{1}{2}$$

in which $\Delta L$ is equal to the difference in optical path length between first leg 16 and second leg 18. This leads to $$\Delta L << \frac{\lambda 1(\lambda 1 + \Delta\lambda)}{2\Delta\lambda}$$

If we assume that $\lambda_1=1,500$ nm, and that $\Delta\lambda=40$ nm, we find that $\Delta L$ should be substantially less than 30 μm. This is a stringent requirement when splicing two 3 dB couplers together to form a Mach-Zehnder interferometer. Stated differently, if we make use of signals having a wavelength of 1,500 nm and allow the legs of our interferometer to differ by as much as 3 mm, this will result in a $\Delta\lambda$ which is much less than 0.4 nm. As optical signals are often significantly broader than this, isolation might well prove to be inadequate unless sufficient care is taken to ensure our optical path lengths are close to equal.

Further complicating our analysis on optical path lengths, the half-wave plates and Faraday rotators will generally impose a certain amount of phase delay, in addition to the effects described by their Jones matrices. The phase delay imposed by a half-wave plate is generally $$\pi(n_e+n_o)d/\lambda$$

in which $n_e$ and $n_o$ are the indices of refraction for the extraordinary and ordinary rays, while d is the thickness of the retarder plate. The phase delay imposed by a Faraday rotator will be $$2\pi \, nd/\lambda$$

in which n is the index of refraction of the rotator material. Hence, if we are to obtain equal optical path lengths for the first and second legs of our interferometer, some compensation and/or adjustment structure should be provided.

Figure 12:
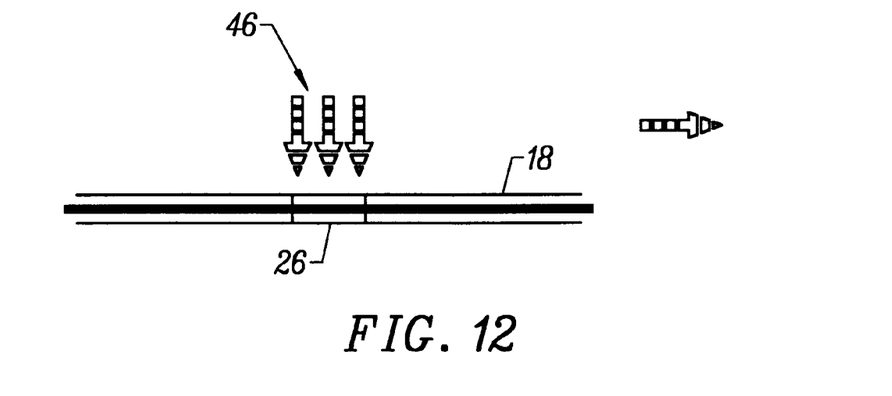
FIG. 12 schematically illustrates a method for adjusting an optical path length by exposing a light sensitive optical fiber to deep UV light.

FIG. 12 schematically illustrates a particularly advantageous method for adjusting the optic path length so as to enhance the bandwidth of the circulators of the present invention. By fabricating second path 18 at least in-part from an optic waveguide having an index of refraction which changes (usually increasing) when exposed to a radiation (such as deep ultraviolet light 46), the optical path length of second leg 18 may be selectively increased after fabrication of the circulator is otherwise complete. As the optical components present on the first leg will tend to give it the longer path length, adjustment mechanism 26 need only be provided on second leg 18.

A variety of alternative radiation sensitive waveguide structures might be used. In fact, common optical fibers will gradually change in index of refraction when exposed to deep ultraviolet light. However, to allow adjustments in a timely and reliable fashion, light sensitive fibers such as those used to fabricate Fiber Bragg Gratings may be included in second leg 18. Such fibers are commercially available from 3M, Specialty Fiber Division. These fibers may be adjusted by selective exposure to deep ultraviolet light, such as light having a wavelength of 193 nm or 248 nm.

Since legs 16, 18 are equal in length, the primary source for polarization mode dispersion will be the birefringent effects of the half-wave plates (the birefringent effects of the fiber can generally be neglected for this short path length). Assuming the half-wave plates comprise quartz, we can calculate the polarization mode dispersion as follows: the difference in index between the ordinary and extraordinary rays in quartz (at a wavelength of 1,550 nm) is about 0.009. The thickness of a low order half-wave plate is about 0.5 mm. As a result, the optical path difference for our two polarization components will be about 0.009 mm, or about $3\times10^{-14}$ secs. Hence, polarization mode dispersion does not appear to be significant.

The polarization dependent loss of the circulator structure is primarily caused by the couplers, the polarization mode coupling of the fibers, and the half-wave plate tolerances. The polarization dependent loss of 3 dB couplers can generally be limited to about 0.1 dB. Polarization mode coupling of fibers having short lengths should be negligible. As it should be possible to limit polarization dependent loss resulting from wave-plate tolerances, the total polarization dependent loss of the circulator should be substantially the same as that of the 3 dB couplers.

The isolation performance of the circulator of FIG. 1 will depend on a variety of factors. Any deviation from an even power split ratio will result in leakage. Differences in the optical path lengths of the two arms can decrease isolation, as can an error in the rotation angle of the Faraday rotator. Similarly, any retardation error in the half-wave plates, or any alignment error in the off-set angle between the two wave-plates will also degrade isolation performance.

A still further potential source of error in the circulator of FIG. 1 is the thermal stability of the device. As described above, signal portions traveling along second leg 18 may travel along an optical fiber (or other waveguide), the entire distance between couplers 12, 14. However, first arm 16 will include Faraday rotator 20, and first and second wave plates 22, 24, and will also include collimating lenses as described above. Such collimating lenses are often aligned and affixed within a stainless steel tube, and the separation between the adjacent ends of the collimaters will typically be about 2.0 mm. Based on the thermal coefficient of expansion for stainless steel, this could result in a change of phase as large as 0.026 π/degree K of temperature change. Given the phase sensitivity of the circulators of the present invention, this could limit the overall thermal stability of the circulator. To accurately maintain the circulation function, the circulator may be held at a constant temperature to ensure optimal performance. Alternatively, more thermally stable support structures may be used, or some thermal compensation structure may be included in either the first or second leg. Such a compensation structure might be incorporated into the phase adjustment mechanism in some embodiments.

A wide variety of materials and structures may be used in Faraday rotator 20. Some of the candidate materials are listed in the following table:

| Material | Operation Wavelength | Magnet Required |
|---|---|---|
| $(BiYbTb)Fe_5O_{12}$ | 1.3–1.6 μm | Yes |
| $Cd_{1-x-y}Mn_xHg_y$ (Typical) (X:0.15–0.17) (y:0.12–0.13') | 0.6–1.1 μm | Yes |
| CdMnHgTe | 0.6–1.1 μm | Yes |
| $(TbBe)_3(FeGa)_5O_{12}$ | 1.5–1.7 μm | No |
| $(GbBi)_3(FeAlGa)_5O_{12}$ | 1.3–1.6 μm | Yes |

-continued

| Material | Operation Wavelength | Magnet Required |
|---|---|---|
| (TbBi)$_3$Fe$_5$O$_{12}$ | 1.3–1.6 µm | Yes |
| (RBi)$_3$Fe$_5$O$_{12}$ (R: Rare Earth Element) | 0.8 µm | Yes |
| YIG (Yttrium Iron Garnet) | 1.1–1.6 µm | Yes |
| TGG (Terbium Gallium Garnet) | 0.5–1.1 µm | Yes |
| (BiTb)$_3$(FeGa)$_5$O$_{12}$ | 1.3–1.6 µm | Yes |

A variety of suitable materials for fabrication of half-wave plates 22, 24 are also known. Suitable retarder plates may comprise calcite, crystal and quartz, or the like.

Figure 8A:
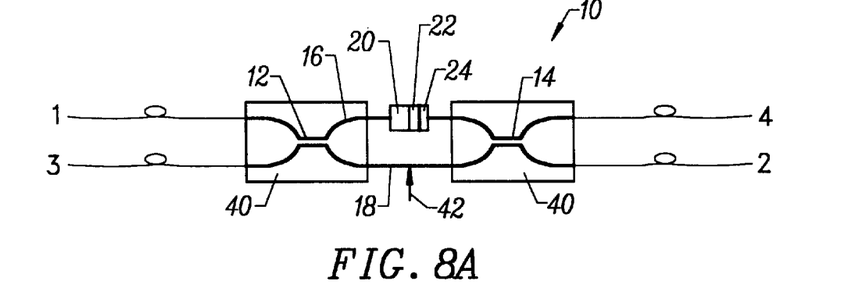
FIGS. 8A and 8B illustrate alternative circulator structures formed at least in-part as an integrated optic waveguide.
Figure 8B:
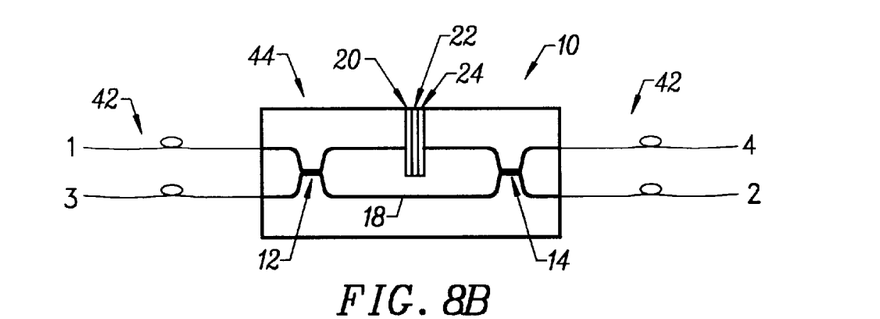
Figure 9:
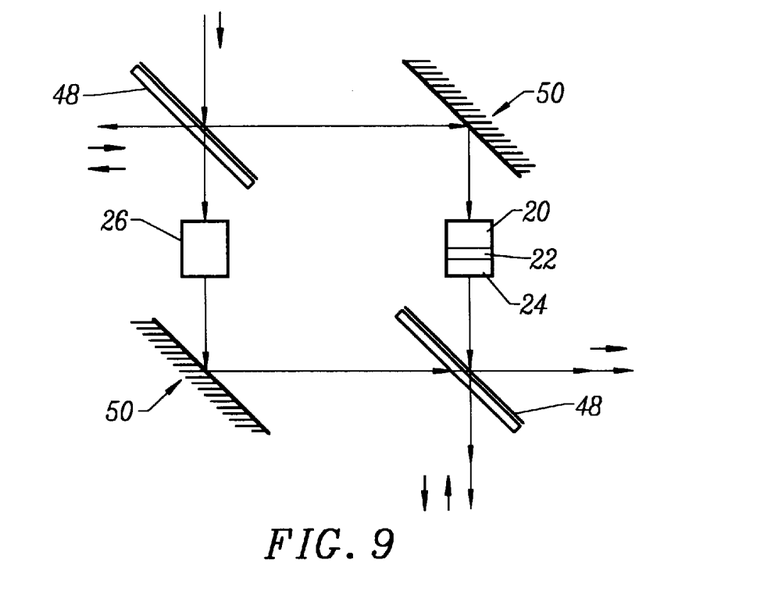
FIG. 9 illustrates a still further alternative circulator according to the principles of the present invention.

FIGS. 8A, 8B, and 9 illustrate alternative circulator structures according to the principles of the present invention. In the embodiment of FIG. 8A, first and second couplers 12, 14 each comprise an integrated optical coupler chip 40. Second leg 18 comprises an optical fiber 42, while first leg 16 includes a combination of optical fiber, the optical waveguides of integrated optic chips 40, and the Faraday rotator and half-wave plates described hereinabove.

In the embodiment of FIG. 8B, an integrated optic waveguide 44 includes first and second couplers 12, 14 and a contiguous optic waveguide for second leg 18. Faraday rotator 20 and half-wave plates 22, 24 are inserted into a slot defined in the substrate of integrated optic waveguide 44. This substrate will typically comprise SI, LiNbO$_3$, polymer, or the like. Optical fibers 42 may be coupled to integrated optic waveguide 44 for transmission of the circulated optic signals, as desired. In some embodiments, leg 18 may again be light sensitive so as to allow adjustment to the path length.

FIG. 12 schematically illustrates a particularly advantageous method for adjusting the optic path length so as to enhance the bandwidth of the circulators of the present invention. By fabricating second path 18 at least in-part from an optic waveguide which changes its index of refraction when exposed to a radiation such as deep ultraviolet light 46, the optical path length of second leg may be selectively increased after fabrication of the circulator is otherwise complete. As the optical components present on that first leg will tend to make that optical path leg longer, adjustment mechanism 26 need only be provided on second leg 18 where both the Faraday rotators and half-wave plates are disposed on the first leg.

A variety of alternative radiation sensitive waveguide structures might be used. In fact, common optical fibers will gradually change in index of refraction when exposed to deep ultraviolet light. However, to allow adjustments in a timely and reliable fashion, light sensitive fibers such as those used to fabricate Fiber Bragg Gratings may be included in second leg 18. Such fibers are commercially available from 3M, Specialty Fiber Division. These fibers may be adjusted by selective exposure to deep ultraviolet light, such as light having a wavelength of 193 nm or 248 nm.

A still further alternative circulator structure is illustrated in FIG. 9. In this embodiment, 50/50 neutral splitters 48 provide the functional equivalent of the couplers described above, while mirrors 50 direct the signal portions along the first and second legs. Nonetheless, the Jones matrices and functional interactions of the optical components remains substantially as described above.

Figure 10:
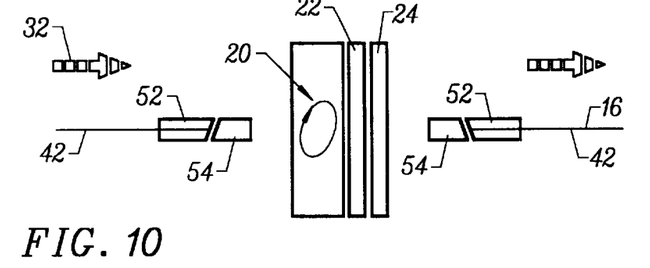
FIG. 10 illustrates the use of collimating lenses to enhance transmission efficiency through the Faraday rotator and/or half-wave plates.

Referring now to FIG. 10, transmission of signal portion 32 along first leg 16 may be enhanced by expanding and collimating the signal passing through Faraday rotator 20 and first and second half-wave plates 22, 24. In this embodiment, optical fibers 42 are held in ferrules 52, and the ends of the fibers and ferrules are polished together at a slight angle (typically between about 8 and 12°). A quarter-pitch or near quarter-pitch GRIN lens 54 is coaxially aligned with ferrule 52. The end of each GRIN lens is polished at a reciprocal angle to the adjacent ferrule end, and the GRIN lens end and ferrule end are held in close proximity, but with a slight gap therebetween. To minimize insertion losses, all transmission surfaces will have anti-reflective coatings.

While theoretical calculations indicate that GRIN lenses of 0.25 pitch would most efficiently expand and focus the transmitted signals, experience has shown that GRIN lenses having a pitch of about 0.23 will provide better results. This may be due in-part to the fact that such calculations generally assume that optical fibers 42 transmit light as a point source, while the light is actually dispersed (although over a very small cross-sectional area).

A variety of alternative collimating structures may be used in place of standard GRIN lenses 54. Optionally, GRIN lenses 54 may be replaced by collimating microlenses, with the surrounding structure remaining substantially as described with reference to FIG. 10. Such microlenses are available from Corning Corp. as Asperic Lens #101. Once again, all surfaces should have anti-reflective coatings to minimize insertion losses.

Still further alternative collimating structures are possible. As can be understood with reference to the equations given above, it is generally beneficial to minimize the total path length of both legs to enhance the overall performance of the circulators. In fact, it is generally beneficial to fabricate compact miniaturized structures for many optical systems. Toward that end, the present invention further provides a novel collimating structure formed by axially aligning the optical fiber (which will typically comprise a single mode fiber) with a short length of graded index fiber.

Single mode optical fibers often have cores between about 2.0 and 10.0 µm. In contrast, graded index fibers will often have cores as large as about 50.0 µm. Nonetheless, the unjacketed diameters of these optical fibers may be quite similar, typically being about 125 µm. Hence, by aligning and affixing a quarter-pitch (or roughly quarter-pitch) length of graded index fiber to a single mode fiber, the optical signal may be both radially expanded and collimated. Similar results may be achieved (with an optionally longer axial length) by using a graded index fiber having a length of 0.25+n pitch, n being an integer (0, 1, 2, 3, . . . ), n optionally being less than 1,000, often less than 100, and in some cases less than 10. The equivalent outer dimensions of the single mode and GRIN fibers greatly facilitates axially aligning these structures. To minimize the overall length of first and second legs 16, 18 of our optical circulator, and also to accurately affix an appropriate length of graded index fiber to our single mode fiber, it is advantageous to couple our single mode and graded index fibers with an end-to-end attachment (rather than using fiber fusing or coupling techniques). Structures and methods for providing end-to-end coupling of optical fibers can be understood with reference to FIGS. 11A–C.

Figure 11A:
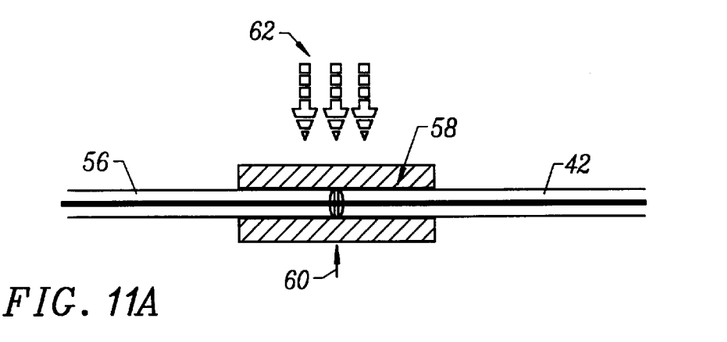
FIGS. 11A–C illustrate alternative methods and structures for splicing optical fibers so as to form the circulator of FIG. 1, which splicing methods are particularly useful for forming a microlens collimator at the end of a single mode fiber by attaching roughly a quarter-pitch length of graded index fiber.

In the splicing method and structure illustrated in FIG. 11A, optical fiber 42 is spliced to fiber structure 56 by inserting the fiber in one end of a glass capillary 58. A photosensitive adhesive 60 is disposed within glass capillary 58 adjacent the end of fiber 42, and fiber structure 56 is inserted into the opposite end of glass capillary 58 so that the ends of the fiber structure and optical fiber are in close proximity. Ultraviolet light 62 is directed through glass capillary 58 to photosensitive adhesive 60 so as to cure the adhesive, which preferably has an optical index matching that of the adjacent optical fibers.

Where fiber structure 56 comprises a graded index optical fiber to be used as a collimating lens, the graded index fiber may later be broken at the desired pitch length from its bonded end. Alternatively, fiber structure 56 may be gradually polished to provide the proper pitch length. It should be noted that the preferred graded index fiber length will again not necessarily be exactly n+0.25 pitch. Possibly because a single mode fiber has a significant cross-section relative to a graded index fiber, the pitch may be anywhere in a range from about n+0.20 to about n+0.25, the graded index fiber ideally having a pitch of about n+0.25. The splice method illustrated in FIG. 11A (and those of FIGS. 11B and C) may also be used to splice a length of photosensitive fiber 26 so as along second leg 18 (as described with reference to FIGS. 1 and 12), or to splice two fiber couplers together.

Figure 11B:
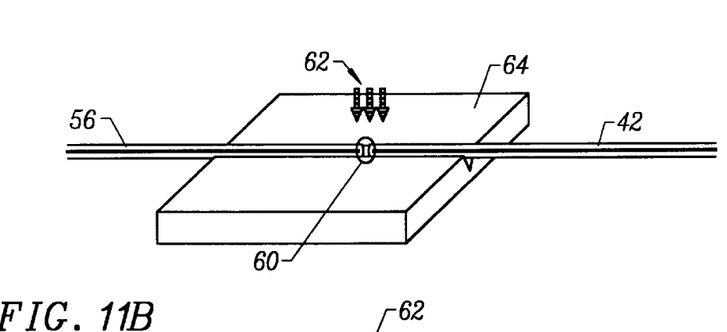
Figure 11C:
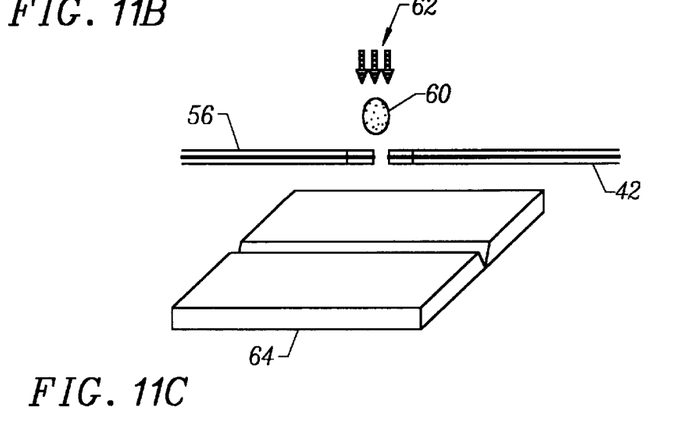

FIGS. 11B and 11C illustrate related methods for splicing optical fiber 42 to any of a variety of fiber structures 56. In these embodiments, the optical fibers are axially aligned using a V-groove plate 64. Bonding is again provided by a photosensitive adhesive with optical index matching, and by curing the adhesive with ultraviolet light 62 while the fibers are held in alignment. Optionally, the bonded fibers may remain affixed to V-groove plate 64, or may instead by removed from the groove after bonding is complete.

While the exemplary embodiments of the present invention have been described in some detail, by way of illustration and for clarity of understanding, a variety of alternatives, modifications, and changes will be obvious to those of skill in the art. Hence, the scope of the present invention is limited solely by the appended claims.

What is claimed is:

1. An optical device comprising:
   a first optical element disposed in a first optical path of a first optical signal so as to direct a portion of the first signal along a first optical path leg and a portion of the first signal along a second optical path leg;
   a second optical element optically coupled to the first and second legs, the second element constructively combining the first signal portions to transmit the first signal along a second optical path, the second element directing a portion of a second optical signal from the second path along the first leg, and a portion of the second signal along the second leg;
   a Faraday rotator disposed along the first leg or the second leg;
   first and second retarder plates disposed along the first leg, wherein the retarder plates are arranged relative to each other such that the first element destructively combines the second signal portions to diminish transmission of the second signal along the first optical path.

2. The optical device of claim 1, wherein the first and second retarder plates comprise half wave plates affixed together.

3. The optical device of claim 2, wherein the first half wave plate has a laterally oriented optical axis, and wherein the second retarder plate has a laterally oriented optical axis offset by 45 degrees from the axis of the first half wave plate.

4. The optical device of claim 2, wherein the Faraday rotator is disposed along the first leg adjacent the first and second half wave plates.

5. The optical device of claim 1, wherein the first leg has a first leg optical path length and the second leg has a second leg optical path length that is equal to the first path length.

6. The optical device of claim 5, further comprising a path length adjustment structure disposed along one of the first leg and the second leg.

7. The optical device of claim 6, wherein the path length adjustor comprises an adjustable wave guide having an index of refraction that varies with exposure to radiation, and wherein the index of refraction of the adjustable waveguide has been by selectively exposed to the radiation to equalize the first leg path length and the second leg path length.

8. The optical device of claim 1, wherein the first and second optical elements evenly separate signals to have equal signal strengths.

9. The optical device of claim 8, wherein the first and second optical elements evenly separate signals of varying wavelengths.

10. The optical device of claim 1, wherein the first and second optical elements comprise first and second wavelength neutral 50/50 beam splitters.

11. The optical device of claim 1, wherein the first and second optical elements comprise first and second 3 dB couplers.

12. The optical device of claim 11, wherein the first and second couplers comprise an integrated optic waveguide along a contiguous substrate, the second leg extending along the substrate from the first coupler to the second coupler.

13. The optical device of claim 1, further comprising a first GRIN lens disposed along the first leg between the first optical element and the retarder plates, and a second GRIN lens disposed along the first leg between the retarder plates and the second optical element.

14. The optical device of claim 1, further comprising a first port disposed in the first path for introducing the first signal, a second port disposed in the second path for introducing the second signal, and a third port optically coupled to the first element, wherein the first element constructively combines the second signal portions and transmits the second signal to the third port.

15. An optical circulator comprising:
    a first port for introducing a first optical signal;
    a first 3 dB coupler optically coupled to the first port, the first coupler directing a portion of the first signal along a first optical wave guide leg and a portion of the first signal along a second optical wave guide leg, the first leg having a first optical path length and the second leg having a second optical path length that is equal to the first path length;
    a second port for introducing a second optical signal;
    a second 3 dB coupler optically coupled to the first leg, the second leg, and the second port, the second coupler directing a portion of a second optical signal from the second port along the first leg, and a portion of the second signal along the second leg, the second coupler constructively combining portions of the first signal portions and transmitting a resulting first passed signal portion to the second port;
    a third optical signal port optically coupled to the first coupler;
    a 90 degree Faraday rotator disposed along the first leg or the second leg;
    first and second half wave plates disposed along the first leg, wherein the half wave plates are arranged relative to each other such that the second signal portions are destructively combined by the first coupler to reduce the second signal at the first port, and are constructively combined by the first coupler to a resulting second passed signal portion at the third port.

16. The circulator of claim 15, wherein the first and second half wave plates are affixed together.

17. The circulator of claim 16, wherein the first half wave plate has a laterally oriented optic axis, and wherein the second retarder plate has a laterally oriented optical axis offset by 45 degrees from the axis of the first half wave plate.

18. The circulator of claim 15, wherein the Faraday rotator is disposed along the first leg adjacent the first and second half wave plates.

19. The circulator of claim 15, further comprising a path length adjustor disposed along one of the first leg and the second leg.

20. The circulator of claim 19, wherein the path length adjustor comprises an adjustable wave guide having an index of refraction that varies with exposure to radiation, and wherein the index of refraction of the adjustable wave guide has been adjusted by selective exposure to the radiation to equalize the first leg path length and the second leg path length.

21. The circulator of claim 15, wherein the first and second couplers comprise an integrated optic waveguide along a contiguous substrate, the second leg extending along the substrate from the first coupler to the second coupler.

22. The circulator of claim 15, further comprising a first GRIN lens disposed along the first path leg between the first coupler and the half wave plates, and a second GRIN lens disposed along the first path leg between the half wave plates and the second coupler.

23. The circulator of claim 15, further comprising a forth optical signal port optically coupled to the second coupler, wherein the first signal is substantially isolated from the third and forth ports, wherein the second signal is substantially isolated from the forth port, and wherein a third signal input into the third port substantially passes to the forth port and is substantially isolated from the first and second ports.

24. A method for fabricating a Mach-Zehnder based optical device, the method comprising:
   affixing a first retarder plate to a second retarder plate;
   inserting the affixed retarder plates within a first optical path leg between a first coupler and a second coupler;
   providing a second optical path leg, the second leg coupling the first and second couplers in parallel with the first leg;
   transmitting first signal portions with the first leg and the second leg;
   cumulatively combining the first signal portions with the second coupler;
   transmitting second signal portions with the first leg and the second leg; and
   interferingly combining the second signal portions with the first coupler.

25. A method as claimed in claim 24, wherein a first sheet of retarder material is affixed to a second sheet of retarder material, and wherein the affixed sheets are separated into a plurality of affixed retarder plates.

26. An optical circulator or isolator comprising:
   a first optical path coupled to first and second path legs, the first and second path legs coupled to a second optical path;
   a non-reciprocal structure including a plurality of optical components distributed asymmetrically between the first and second path legs; and
   a path length adjustment structure disposed along at least one of the first and second path legs, the adjustor having a controllably variable optical path length.

* * * * *